United States Patent

[11] 3,585,324

| [72] | Inventors | Alfred Renndorfer<br>Munich;<br>Johann Roth, Schwabhausen, both of,<br>Germany |
|---|---|---|
| [21] | Appl. No. | 803,013 |
| [22] | Filed | Feb. 27, 1969 |
| [45] | Patented | June 15, 1971 |
| [73] | Assignee | Niezoldi S. Kramer GmbH<br>Munich, Germany |
| [32] | Priority | Dec. 9, 1968 |
| [33] | | Germany |
| [31] | | P 16 22 903.1 |

[54] SWITCH AND REEL DEVICE FOR REMOTE-CONTROL OPERATION OF PHOTOGRAPHIC APPARATUS
16 Claims, 4 Drawing Figs.

[52] U.S. Cl. ..................................... 200/52,
191/12.2, 242/107.7
[51] Int. Cl. ....................................... H01h 35/00
[50] Field of Search ........................................... 200/52,
61.15; 191/12, 12.2, 12.4; 340/29; 242/36, 77.2,
107.7

[56] References Cited
UNITED STATES PATENTS

| 1,714,225 | 5/1929 | Hyde et al. | 191/12 X |
| 2,506,583 | 5/1950 | Duerr, Jr. | 191/12.2 |
| 2,979,576 | 4/1961 | Huber | 191/12.4 |
| 3,110,453 | 11/1963 | Becker et al. | 191/12.2 X |
| 3,115,311 | 12/1963 | Miller | 191/12.2 X |
| 3,450,369 | 6/1969 | Blanch et al. | 242/107.7 |
| 3,489,866 | 1/1970 | Tamarin | 191/12.2 |

Primary Examiner—J. R. Scott
Attorney—Michael S. Striker

ABSTRACT: A reel which is connected with one end of an electric cable and is provided with an electric switch which can be closed by hand to establish an electric connection between the conductors in the cable. The cable can be convoluted on or paid out by the core of the reel and its free end is provided with a plug which can be inserted into the socket of a camera or projector to complete a circuit in such apparatus in response to closing or opening of the switch. The reel is further formed with a socket which can receive the plug on the cable of a second reel and is connected in parallel with the switch so that an operator can complete an electric circuit which is connected with the plug of the first cable by closing or opening the switch of the second reel.

INVENTOR
ALFRED RENNDORFER
JOHANN ROTH
BY
their ATTORNEY

SWITCH AND REEL DEVICE FOR REMOTE-CONTROL OPERATION OF PHOTOGRAPHIC APPARATUS

BACKGROUND OF THE INVENTION

The present invention relates to a device for remote-control operation of photographic apparatus, cinematographic apparatus or other types of current-consuming apparatus. More particularly, the invention relates to improvements in devices for completing and/or opening one or more electric or electronic circuits by remote control. Still more particularly, the invention relates to improvements in devices for completing or opening one or more circuits through the intermediary of one or more electric cables.

It is already known to provide the housing of a still camera or motion picture camera with a reel which can store a supply of electric cable. The reel is rotatable by a crank arm to pay out or collect the cable on its core. The free end of the cable is provided with a switch which can be closed by the operator and which can be coupled to a holder on the housing of the camera when the cable is convoluted on the core. In order to use the switch, the operator disconnects it from the holder and unwinds a desired length of the cable so that a circuit in or on the camera can be completed or opened from a desired distance. The cable contains conductors which connect the switch with the circuit by way of sliprings or the like.

A drawback of the just described remote-control camera operating device is that the reel adds to the bulk of the camera. Therefore, such devices failed to gain widespread acceptance by manufacturers of photographic apparatus; they are used mainly on photographic or cinematographic reproducing apparatus, i.e., on motion picture projectors or slide projectors which are often bulky so that the reel contributes negligibly to the overall dimensions of such apparatus.

SUMMARY OF THE INVENTION

An object of our invention is to provide a device for remote-control operation of photographic, cinematographic or other current-consuming apparatus and wherein a supply of electric cable can be stored on a reel but the reel need not be mounted in or on the housing or body of such apparatus.

Another object of the invention is to provide a device of the just outlined character wherein, in addition to serving as a means for storing or paying out a supply of electric cable, the reel can perform one or more additional advantageous functions.

A further object of the invention is to provide a device which can serve to operate one or more photographic or cinematographic apparatus from close up or by remote control and which can also serve to synchronize the operation of one such apparatus with one or more additional apparatus.

An additional object of the invention is to provide a device which can complete or open one or more electric or electronic circuits without resorting to sliprings or analogous sensitive and expensive parts.

Another object of the invention is to provide a portable device of the above outlined character which is small and compact enough to be stored in a pocket, which can be used for remote-control operation of several types of photographic and/or cinematographic apparatus, including compact still cameras or motion picture cameras, and which can be used with equal advantage by professionals as well as by amateur photographers or beginners.

The improved device is intended for operation of photographic, cinematographic or other current-consuming apparatus by remote control. It comprises a reel, an electric cable having elongated conductor means including end portions secured to the reel, and electric switch means provided on the reel and actuatable to establish or terminate an electrical connection between the end portions of conductor means. The cable can be coiled onto or paid out by the reel and its free end carries a preferably male coupling member which can be separably connected with a complementary coupling member in a camera or the like. The coupling members have interengaging contacts or terminals so that closing of the switch in or on the reel can result in completion of a circuit whose terminals are connected with the contacts of the complementary coupling member.

The reel can be stored and transported independently of a camera or other current-consuming apparatus and is preferably provided with means for normally retaining the cable in convoluted condition.

The novel features which are considered as characteristic of the invention are set forth in particular in the appended claims. The improved device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
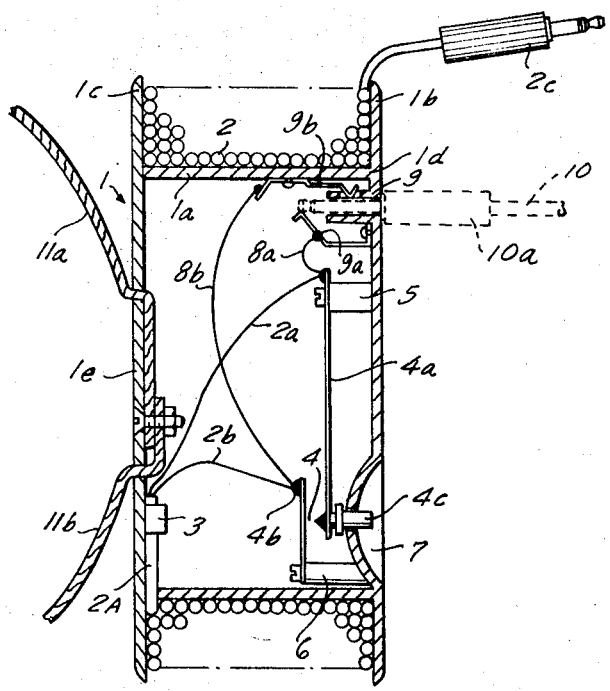
FIG. 1 is an axial sectional view of a reel in a remote-control operating device which embodies one form of the invention, the cable being shown in convoluted condition but with the retaining means moved to idle position.

FIG. 1 shows a reel 1 having two flanges $1b$, $1c$ flanking a hollow cylindrical core $1a$ to confine the convolutions of an electric cable 2 which is wound around the core. The inner end portion 2A of the cable 2 extends substantially radially inwardly through an opening in the core $1a$ and is affixed to the central portion $1e$ of the flange $1c$ by a suitable clamp 3. The cable 2 includes an insulating sheath surrounding two elongated conductors $2a$, $2b$ which extend beyond the clamp 3 and are respectively connected with contacts $4a$, $4b$ of a normally open electric switch 4. The contacts $4a$, $4b$ are affixed to the median portion $1d$ of the flange $1b$ by bolts 5 and 6. A depressible actuating member or knob $4c$ is reciprocably mounted in the flange $1b$ and can move the contact $4a$ against the contact $4b$ to thereby close the switch 4. The outer portion of the knob $4c$ is accommodated in a shallow recess or notch 7 in the flange $1b$ to prevent accidental closing of the switch 4. The outer end portion of the cable 2 carries a male coupling member or plug $2c$ which can be inserted into the female coupling member or socket of a still camera or motion picture camera to energize an electromagnet or the like (not shown) in response to closing of the switch 4. Such electromagnet can initiate an exposure, for example, by opening of the shutter.

The switch 4 is connected in parallel with a female coupling member or socket 9 which is mounted in the flange $1b$ and has contacts or terminals $9a$, $9b$ connected with conductors $2a$, $2b$ by conductors $8a$, $8b$. The contact $9b$ can engage the outer contact of a male coupling member or plug $10a$ and the contact $9a$ can engage the center contact of the plug $10a$. The latter is connected with a second cable 10 which corresponds to the cable 2 and is connected with a second reel (not shown). Such cable 10 constitutes an extension of the cable 2. When the plug $10a$ is withdrawn from the socket 9, the second cable 10 and its reel can be used in the same way as the cable 2 and reel 1.

The switch 4 and socket 9 are mounted in such a way that the flange $1b$ can be placed onto a flat surface without causing closing of the switch 4 (due to the provision of aforementioned notch 7) and without establishing an electrical connection between the contacts $9a$, $9b$.

Figure 2:
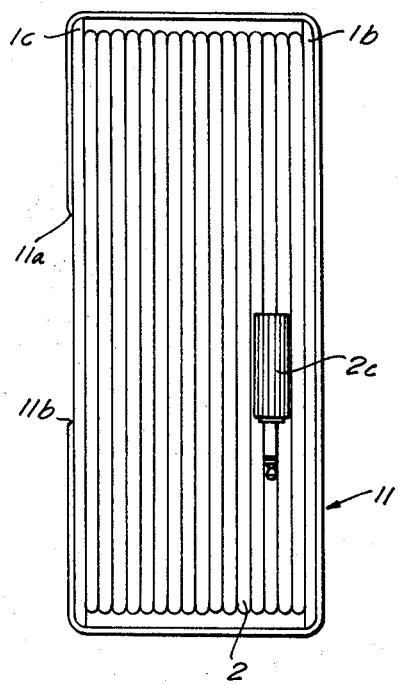
FIG. 2 is a plan view of the reel with the retaining means in operative or retaining position.
Figure 3:
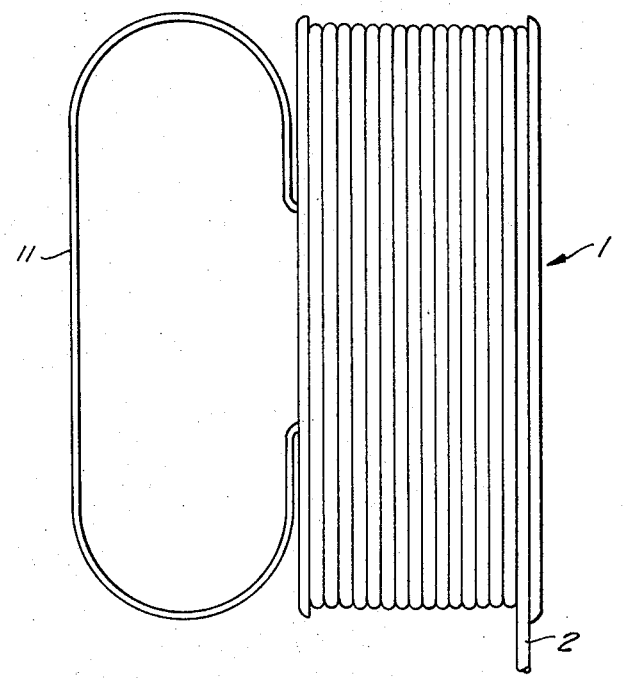
FIG. 3 is a similar plan view with the retaining means in idle position and with the cable partially withdrawn.

The central portion $1e$ of the flange $1c$ has two openings for the ends $11a$, $11b$ of an elastically deformable retaining member or strap 11. The ends 11a, 11b are secured to the flange 1c by a screw and nut or by analogous fastener means. When the reel 1 is not in use, the strap 11 is moved to retaining position in which it is applied around the flanges 1b, 1c in a manner as shown in FIG. 2 to thereby prevent unwinding of the cable 2. When the reel 1 is in use, the strap 11 is moved to the idle position of FIG. 3 to form a loop which can receive four fingers of one hand while the thumb remains free to depress the knob 4c. It is clear that the reel 1 can be provided with other means for preventing uncontrolled unwinding of the cable 2 and for preventing the plug 2c from moving back and forth when the reel is not in use.

An important advantage of the improved reel is that it can be used to initiate certain operations of a still camera, motion picture camera, projector or other photographic or cinematographic apparatus from close to or at a desired distance from the apparatus. Thus, the operator can depress the knob 4c when the cable 2 is fully or partially convoluted on or fully paid out by the core 1a. It is normally preferred to employ a cable 2 of standard length to facilitate mass production of the device. The standard length is selected in such a way that the reel is not too bulky when the cable is convoluted on the core 1a but that the cable 2 is long enough to permit remote-control operation of a photographic or other current-consuming apparatus from a reasonable distance, for example, to take pictures of wild animals. If the reel is to be used under special circumstances, for example at a distance from the camera which exceeds the length of its cable 2, the operator can readily connect the reel with one or more additional reels (cable 10) to take care of such exceptional situation.

The plug 9 can receive the output member of a mechanical or electronic impulse generator or the like. For example, such impulse generator may include a suitable timer adapted to complete a camera circuit which is connected to the plug 2c with a predetermined delay, i.e., such timer then replaces the switch 4 which i.e., remain open. Also, the socket 9 can receive the plug of a sound unit which is set up at a point remote from the camera and is used as an impulse generator to initiate the making of one or more exposures at predetermined intervals or with a predetermined delay following starting of the sound unit.

Figure 4:
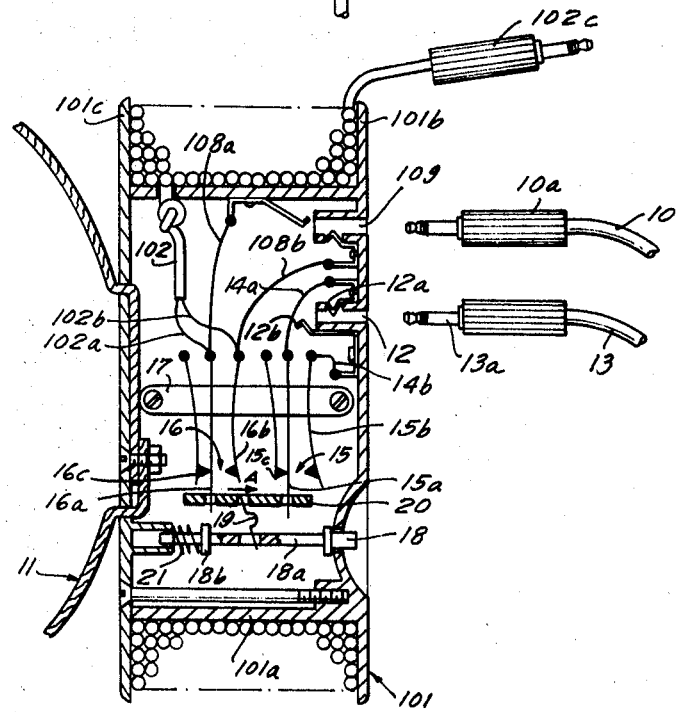
FIG. 4 is a sectional view of a reel in a second remote-control operating device.

FIG. 4 illustrates a second reel 101 having a hollow core 101a, two flanges 101b, 101c and supporting a length of convoluted cable 102. The conductors 102a, 102b of the cable 102 are connected with conductors 108a, 108b for the contacts of the female coupling member or socket 109 and with fixed contacts 16b, 16c of a first electric switch 16. This switch has a movable contact 16a which always engages one of the contacts 16b, 16c. The core 101a further accommodates a second electric switch 15 having fixed contacts 15b, 15c which flank a movable contact 15a. A second female coupling member or socket 12 is provided in the flange 101b and includes contacts 12a, 12b which are respectively connected with conductors 14a, 14b. The conductors 14a, 14b are connected with the contacts 15a, 15b of electric switch 15. The socket 12 can receive a male coupling member or plug 13a having an outer contact adapted to engage the contact 12a and a center contact adapted to engage the contact 12b. The plug 13a is connected with a cable 13 which is connected with a sound unit (not shown) for use with motion picture cameras or motion picture projectors.

The contacts of the switches 15, 16 are mounted on or in a bridge member 17 which is secured to the core 101a. The actuating means for the switches 15, 16 comprises a knob 18 a portion of which extends into a recess or notch of the flange 101b and which is biased to the illustrated idle position by a weak helical return spring 21. The spring 21 surrounds a stem 18a of the knob 18 and bears against a collar 18b. A snap-over leaf spring 19 couples the stem 18a with a shifter 20 which is in engagement with the free ends of movable contacts 15a, 16a and consists of insulating material. The contacts 15c, 16c are idler contacts or rest contacts, i.e., the switches 15, 16 are ineffective when their movable contacts 15a, 16a respectively engage the contacts 15c, 16c. When the knob 18 is depressed to stress the spring 21, the leaf spring 19 causes the shifter 20 to move in the direction indicated by arrow A and to thereby move the contacts 15a, 16a into engagement with the fixed contacts 15b, 16b to close the switches 15 and 16. Thus, the circuit in the camera which is connected with the plug 102c is completed simultaneously with completion of circuit which is connected to the plug 13a. This insures full synchronization of camera operation with the operation of sound unit. The arrangement is such that the switches 15, 16 remain closed upon release of the knob 18, i.e., it is necessary to release and to again depress the knob 18 in order to move the contacts 15a, 16a to the positions shown in FIG. 4. The spring 19 is a well-known snap-over spring which can maintain the shifter 20 is its left-hand or in its right-hand end position.

The plug 10a and cable 10 form part of an extension which can be used to complete the camera circuit (plug 102c) without necessitating a depression of the knob 18. The retaining strap 11 is constructed, mounted and used in the same way as described in connection with FIGS. 1—3.

If the switch 15 is to open in response to closing of the switch 16, or vice versa, the conductor 14b is disconnected from the contact 15b and is connected to the contact 15c. The contact 12b is then connected with the contact 15c. This is desirable if the circuit of the camera which is connected with the plug 102c is such that an exposure is made in response to opening of the switch 16 whereas the starting of sound unit (connected to the cable 13) requires closing of the switch 15. The nature of the sound unit can be such that it is started in response to opening of the switch 15 whereas the exposure is made in response to closing of the switch 16. It is further possible that the camera is designed to make an exposure in response to opening of the switch 16 and that the sound unit is started in response to opening of the switch 15; the electrical connections in the core 101a are then identical with those shown in FIG. 4.

It will be seen that the remote-control operating device of our invention dispenses with a switch at the free end of the cable 2 or 102 and that it replaces such switch with switch means 4 and/or 15, 16 which is mounted in or on the reel 1 or 101 so that the plug 2c or 102c can be attached to the socket in a compact camera and that the circuit or circuits in such camera can be completed or opened by a person holding or having access to the reel 1 or 101. Thus, the reel need not be mounted on the camera housing so that it can be transported and/or stored independently of the camera as well as used with different types of cameras or other photographic or cinematographic apparatus. The reel can be designed to fit into a pocket and its flanges may but need not have a circular outline.

The socket 9 or 109 constitutes an advantageous optional feature of our device. Such socket enables the operator to couple the reel 1 or 101 with one or more similar reels in order to be in a position to operate a camera or the like from a distance which is a multiple of the length of a cable 2 or 102.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What we claim as new and desire to be protected by Letters Patent is set forth in the appended claims.

1. A device for operating photographic, cinematographic or other current-consuming apparatus by remote control, comprising a reel; an electric cable having elongated conductor means including first end portions secured to said reel and second end portions connectable with the circuit in a current-consuming apparatus, said reel serving as a support for said cable in convoluted condition thereof; electric switch means provided on said reel and actuatable to establish or terminate a current-conducting connection between the first end portions of said conductor means; and actuating means for said electric switch means connected to the same and operable from the outside of said reel.

2. A device as defined in claim 1, wherein said conductor means includes second end portions and wherein said cable comprises an end portion provided with a coupling member connected with said second end portions and adapted to connect said conductor means with the circuit in a current-consuming apparatus.

3. A device as defined in claim 1, further comprising retainer means provided on said reel and movable to and from a retaining position in which said retainer means confines the cable on said reel.

4. A device for operating photographic, cinematographic or other current-consuming apparatus by remote control, comprising a reel; an electric cable having elongated conductor means including first end portions secured to said reel and second end portions, said cable further having an end portion provided with a coupling member connected with the second end portions of said conductor means and adapted to connect said conductor means with the circuit in a current-consuming apparatus, said reel serving as a support for said cable in convoluted condition thereof; electric switch means provided on said reel and actuatable to establish or terminate a current-conducting connection between said conductor means; and a second coupling member connected in parallel with said switch means and connectable with the coupling member on the cable of a second device.

5. A device as defined in claim 4, wherein said first mentioned coupling member is a plug and said second coupling member is a socket adapted to receive said plug.

6. A device as defined in claim 4, wherein said reel comprises a core and a flange adjacent to one end of said core, said second coupling member being mounted on said flange.

7. A device as defined in claim 6, wherein said core is hollow and accommodates said coupling member.

8. A device for operating photographic, cinematographic or other current-consuming apparatus by remote control, comprising a reel including a flange having an outer side provided with a recess; an electric cable having elongated conductor means including end portions secured to said reel, said reel serving as a support for said cable in convoluted condition thereof; electric switch means provided on said reel and actuatable to establish or terminate a current-conducting connection between said conductor means; and actuating means for said switch means, said actuating means being movably mounted on said reel and having a portion extending into said recess.

9. A device for operating photographic, cinematographic or other current-consuming apparatus by remote control, comprising a reel including a flange having an outer side; an electric cable having elongated conductor means including first end portions secured to said reel and second end portions, said cable further having an end portion provided with a first coupling member connected with the second end portions of said conductor means and adapted to connect said conductor means with the circuit in a current-consuming apparatus, said reel serving as a support for said cable in convoluted condition thereof; electric switch means provided on said reel and actuatable to establish or terminate a current-conducting connection between said conductor means; and a female coupling member adapted to receive said first coupling member and having a pair of electric contacts connected in parallel with the first end portions of said conductor means, said female coupling member being mounted on said flange and said first coupling member being insertable into said female coupling member from the outer side of said flange.

10. A device as defined in claim 9, wherein said female coupling member has an inlet which is flush with the outer side of said flange.

11. A device for operating photographic, cinematographic or other current-consuming apparatus by remote control, comprising a reel; an electric cable having elongated conductor means including end portions connected to said reel, said reel serving as a support for said cable in convoluted condition thereof; electric switch means provided on said reel and actuatable to establish or terminate a current-conducting connection between said conductor means; and retainer means provided on said reel and movable to and from a retaining position in which said retainer means prevents unwinding of cable from said reel, said retainer means comprising an elastic strap.

12. A device as defined in claim 11, wherein said reel comprises a pair of flanges and a core extending between said flanges, said strap being connected with one of said flanges and surrounding portions of said flanges in said retaining position thereof.

13. A device for operating photographic, cinematographic or other current-consuming apparatus by remote control, comprising a reel; an electric cable having elongated conductor means including first end portions secured to said reel and second end portions, said cable further having an end portion provided with a first coupling member connected to the second end portions of said conductor means and adapted to connect said conductor means with the circuit in a current-consuming apparatus, said reel serving as a support for said cable in convoluted condition thereof; electric switch means provided on said reel and actuatable to establish or terminate a current-conducting connection between said conductor means; a second coupling member provided on said reel and connectable with the coupling member of a further cable; and second switch means provided in said reel and movable between open and closed positions to thereby establish or terminate an electrical connection between the conductors of said further cable.

14. A device as defined in claim 13, further comprising common actuating means provided on said reel for said first mentioned and said second switch means.

15. A device as defined in claim 13, further comprising actuating means provided on said reel for closing one of said switch means in response to opening of the other switch means, and vice versa.

16. A device as defined in claim 13, further comprising common actuating means provided on said reel for said first mentioned and said second switch means, said actuating means comprising shifter means movable between two end positions and snap-over spring means for yieldably holding said shifter means against movement from either of said end positions.